United States Patent
Krause

Patent Number: 5,670,753
Date of Patent: Sep. 23, 1997

[54] DISC-SHAPED TRANSDUCER FOR A WEIGHING SYSTEM

[75] Inventor: Matthias Krause, Hamburg, Germany

[73] Assignee: U.S. Philips Corporation, New York, N.Y.

[21] Appl. No.: 131,274

[22] Filed: Oct. 4, 1993

Related U.S. Application Data

[63] Continuation of Ser. No. 780,163, Oct. 21, 1991, abandoned.

[30] Foreign Application Priority Data

Oct. 31, 1990 [DE] Germany ............ 40 34 629.3

[51] Int. Cl.$^6$ .................. G01G 3/14; G01L 1/04; G01L 1/20
[52] U.S. Cl. ........................... 177/211; 73/862.65
[58] Field of Search ............... 177/211, 229; 73/862.65, 862.66

[56] References Cited

U.S. PATENT DOCUMENTS

| | | | |
|---|---|---|---|
| 4,478,086 | 10/1984 | Gram | 73/862.66 X |
| 4,546,838 | 10/1985 | Ormond | 177/211 |
| 4,589,291 | 5/1986 | Sander | 73/862.65 |
| 4,694,921 | 9/1987 | Johnston | 177/211 X |
| 4,702,329 | 10/1987 | Click | 177/211 |

FOREIGN PATENT DOCUMENTS 191305  5/1989  European Pat. Off.

OTHER PUBLICATIONS

"Compression Load Cells, 1986" Revere Corp. of Europe GmbH, 6382 Friedrichsdorf 2, DE.

*Primary Examiner*—Michael L. Gellner
*Assistant Examiner*—Randy W. Gibson
*Attorney, Agent, or Firm*—Anne E. Barschall; Arthur G. Schaier; William L. Botjer

[57] ABSTRACT

The invention relates to a disc-shaped transducer (10) for a weighing system, comprising surfaces (14) which extend parallel to one another and in a direction of application of a force (F) to be measured, at least one of said surfaces being provided with a sensing element (13) for converting a force-dependent deformation into a useful signal. Transducers (10) of this kind usually exhibit a material-dependent, significant hysteresis effect which adversely affects their calibration possibilities; therefore, the transducer (10) comprises four sub-faces (21) which are formed by a centre line (17) parallel to the direction of application of the force (F) and a centre line (20) which is orthogonal thereto, at least two of said sub-faces which adjoin one another in only one point comprising a respective area of reduced cross-section or reduced thickness, so that the hysteresis can be compensated for.

10 Claims, 2 Drawing Sheets

DISC-SHAPED TRANSDUCER FOR A WEIGHING SYSTEM

This is a continuation division of application Ser. No. 07/780,163, filed Oct. 21, 1991 abandoned.

BACKGROUND OF THE INVENTION

1. Field of the Invention

The invention relates to a disc-shaped transducer for a weighing system, comprising surfaces which extend parallel to one another and parallel to the direction of application of a force to be measured, on at least one of said surfaces there being provided a sensing element for converting a force-dependent deformation into a useful signal.

Transducers of this kind usually form part of a load cell for a weighing system which operates according to the shear stress principle and which comprises sensing elements.

2. Prior Art

Load cells of this kind are known, for example, from the publication "Compression Load Cells, 1986", Revere Corp. of Europe GmbH, 6382 Friedrichsdorf 2, DE. The type SSB load cell described in the cited publication comprises a compressively loaded member with an aperture which is oriented orthogonally with respect to the direction of application of the force to be measured, a transducer being arranged approximately at the centre thereof. The transducer thus forms a partition separating two symmetrical chambers. Approximately at the centre of the surfaces of the disc-shaped transducer there are provided strain gauges which act as sensing elements. For electrical interconnection of the strain gauges apertures are provided along a centre line of the transducer extending parallel to the direction of application of the force to be measured. These apertures also serve to adjust the rigidity of the transducer.

The operating precision of such a load cell is dependent on the linearity and notably on the hysteresis of the transducer. The linearity is determined substantially exclusively by the geometrical configuration. However, the hysteresis, i.e. the fact that the output signal of a deformed member is dependent on the preceding deformation process, notably on the amount and the direction of the deformation, is a characteristic of the material and hence dependent on the material. Because the material-dependent hysteresis component cannot be fully eliminated, not even by a careful choise of materials, known load cells thus have a substantial drawback because the precision is thus limited; this is disadvantageous notably in view of the imposed calibration requirements.

A further drawback of the known load cell consists in that its desired precision is lost in the case of overloading.

SUMMARY OF THE INVENTION

It is an object of the present invention to provide a transducer for a weighing system which supplies a quasi hysteresis-free, calibratable useful signal when it is sensed via at least one sensing element.

This object is achieved in accordance with the invention in that the transducer comprises four sub-faces which are formed by a centre line parallel to the direction of application of the force and a centre line which is orthogonal thereto, at least two of said sub-faces which adjoin one another in only one point comprising a respective area of reduced cross-section in order to influence the hysteresis effect.

Surprisingly, tests have shown that a construction of the transducer in accordance with the invention, comprising areas of reduced cross-section or reduced thickness, is suitable to achieve a reduction of the material-dependent hysteresis by deflection and/or concentration of the flux of force in the transducer. Moreover, overloading tests have shown that transducers in accordance with the invention are particularly insensitive to overloading, so that transducers are obtained which can be used very well for applications where calibration is prescribed.

In a special embodiment of the invention, the sub-faces of the transducer which are situated in the densest flux of force comprise a respective area of reduced cross-section. In order to intensify the hysteresis compensation effect, alternatively all four sub-faces may comprise an area of reduced cross-section. It has been found that such transducers in accordance with the invention not only enable any material-dependent hysteresis effect compensation, but also such a behaviour of the sensing element as if a negative hysteresis were present.

As a result of the reduction of the hysteresis, transducers which exhibit very small deviations from the strictly linear behaviour can be realised; this is of advantage notably for calibratable transducers.

In a preferred embodiment of the invention, the transducer may have a circular shape, i.e. it may terminate with a respective semi-circular section in the direction of the orthogonal centre line.

Preferably, apertures having a circular cross-section form the areas of reduced cross-section of the sub-faces. The centre of these apertures is preferably situated on a radius which encloses an angle of 45°±15° with respect to one of the centre lines. The diameter of the apertures in the sub-faces preferably amounts to from 10 to 30% of the diameter of the circular transducer or the semi-circular sections.

In a preferred embodiment of the invention, in the edge zone of the transducer there may be provided apertures which are situated to both sides of the centre of the sections on the centre line extending parallel to the direction of application of the force. These apertures have only a limited effect on the hysteresis to be compensated, but can receive connection means such as leads for the sensing elements which are constructed as, for example, strain gauges which may be arranged on both surfaces of the transducer. These apertures also serve to adapt the rigidity or the sensitivity of the transducer and, therefore, preferably have a maximum diameter of 40% of the diameter of the circular transducer or the semi-circular sections.

In a preferred embodiment of the invention, the transducer comprises a rectangular section between the two semi-circular sections corresponding to the two halves of a circular transducer. In this embodiment of the invention the centres of the apertures in the corresponding sub-faces are provided in an area enclosed by the orthogonal centre line, the 45° radius, an adjoining of circular arc portion of a semi-circular section, and an adjoining diagonal of the rectangular section.

In a preferred embodiment, the sensing element is constructed as a measuring bridge circuit and is provided on the surface of the transducer as a strain gauge, for example, using a thin-film technique, the transducer itself being made of a high-quality material.

Moreover, a transducer in accordance with the invention can be used quasi in all practical shearing stress load cells and may be integral therewith.

Further attractive embodiments of the invention are disclosed in the dependent claims.

BRIEF DESCRIPTION OF THE DRAWINGS

One embodiment will be described in detail hereinafter with reference to a drawing. Therein.

DETAILED DESCRIPTION OF THE PREFERRED EMBODIMENTS

Figure 1:
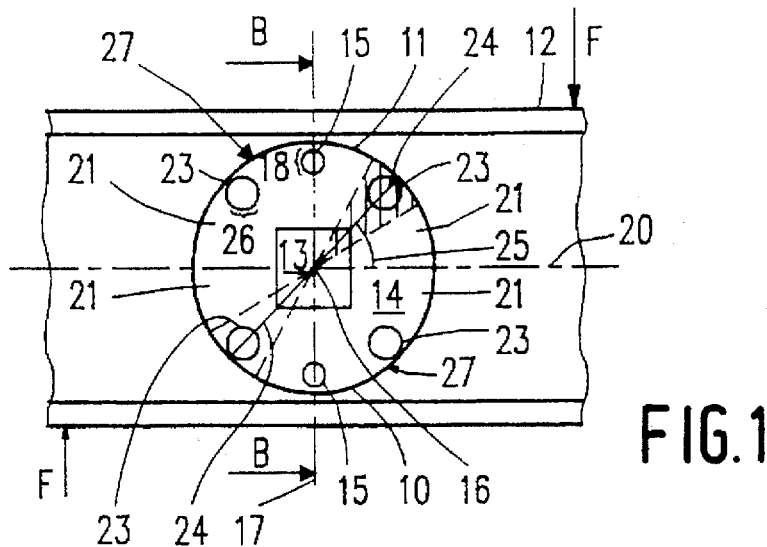
FIG. 1 shows a load cell of a weighing system comprising a circular transducer in accordance with the invention.

FIG. 1 shows a disc-shaped transducer 10 in accordance with the invention, which transducer is arranged on its edge in an aperture 11 in a load cell 12. The load cell 12 shown is a shear stress cell exposed to a force F. The transducer 10 is secured in the aperture 11 of the load cell 12 by welding, bonding, pressing or the like and comprises a respective sensing element 13 approximately at the centre of each of its mutually parallel surfaces 14. The transducer 10 and the load cell 12 may also be constructed so as to be integral.

The sensing elements 13 are constructed as a measuring bridge circuit and are deposited on the surfaces 14 of the transducer 10 as strain gauges, for example, using a thin-film technique. They serve to convert the force-dependent deformations transferred from the compressively loaded member, i.e. the load cell 12, to the transducer 10 into a preferably electrical useful signal. For the connection of the sensing elements 13 arranged on the two surfaces 14 customary apertures 15 are provided to both sides of the centre 16 of the transducer 10 along a centre line 17 which extends parallel to the direction of application of the force F. The apertures 15 are preferably provided in the edge zone of the transducer 10. Thus, they also serve to adapt the rigidity or the sensitivity of the transducer 10. The apertures 15 preferably have a diameter 18 amounting to at the most 40% of the diameter 19 (see FIG. 2) of the preferably circular transducer 10.

The transducer 10 is subdivided into four sub-faces 21 by the centre line 17 and a centre line 20 which is orthogonal thereto. At least two of these sub-faces 21, contacting one another exclusively at the centre 16 or adjoining one another only in one point, comprise an area of reduced cross-section or reduced thickness. It is to be noted that the transducer 10 itself has a constant cross-section 22 or a constant thickness (see FIG. 2).

Preferably, at least those sub-faces 21 which are exposed to the densest flux of force due to the application of the force F comprise a respective area of reduced cross-section. It is also advantageous when all four sub-faces 21 are provided with an area of reduced cross-section, because the desired hysteresis-reducing effect can thus be increased.

The areas of reduced cross-section of the transducer 10 are preferably formed as apertures 23 having a circular cross-section. The centre of the apertures 23 is preferably situated on a radius 24 which encloses an angle 25 of 45°±15° with respect to one of the centre lines 17 or 20. This area is shaded in the FIGS. 1 and 4. The apertures 23 in the sub-faces 21 preferably have a diameter 26 of from 10 to 30% of the diameter 19 of the circular transducer 10 or the semi-circular sections 27.

Figure 2:
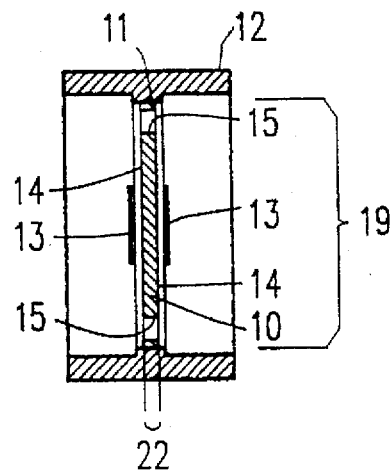
FIG. 2 is a sectional view taken along the line B—B in FIG. 1.

FIG. 2 is a sectional view taken along the line B—B in FIG. 1. This Figure clearly shows the cross-section of the load cell 12 which comprises at its centre an aperture 11 in which the transducer 10 is arranged and secured. The cross-section 22 or the thickness of the transducer 10 is constant per se. At the centre of each of the surfaces 14 of the transducer 10 there is provided a respective sensing element 13. In order to allow passage to connection leads (not shown) of the sensing elements 13 on both surfaces 14 of the transducer 10, apertures 15 are provided above and below the sensing elements 13 in the Figure. These apertures 15 also serve to adapt the rigidity or the sensitivity of the transducer 10. It is to be noted that the shape of a load cell 12 as shown in the FIGS. 1 to 3 is given merely by way of example and that the transducer 10 in accordance with the invention can also be used in other load cells 12 having a different shape, for example, as shown in FIG. 4.

Figure 3:
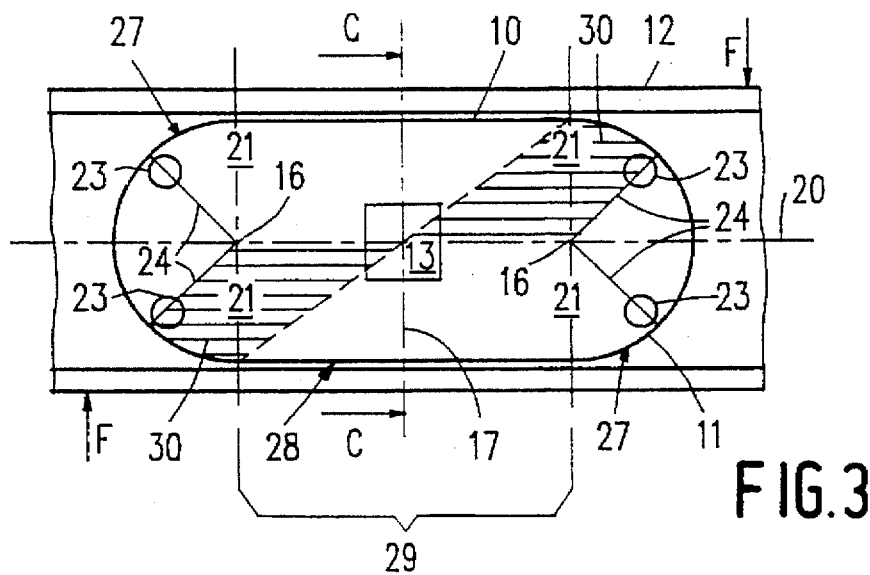
FIG. 3 shows a modified load cell comprising a modified transducer.

FIG. 3 shows a load cell 12 which corresponds substantially to the load cell shown in the FIGS. 1 and 2 but which comprises a transducer 10 which terminates in semi-circular sections 27 in the direction of the orthogonal centre line 20, a rectangular section 28 being situated therebetween. Such a load cell 12 is particularly attractive in view of rigidity or sensitivity and can also be provided with apertures 23 in accordance with the invention in the correspondingly enlarged sub-faces 21. The centres of the apertures 23 are preferably situated in the shaded areas 30 of the sub-faces 21 in FIG. 3, i.e. in an area 30 which is bounded by the orthogonal centre line 20, the 45° radius 24, an adjacent segment of arc of the section 27, and a diagonal of the section 28. The area of the sensing elements 13, being arranged in the centre of the rectangular section 28, however, is excluded. The rectangular section 28 has a length 29 along the centre line 20.

Optimum positioning of the apertures 23 in the permissible area 30 is achieved in dependence on the measuring grid of the sensing elements 13, i.e. on their internal construction. With the exception of the apertures 15, the view of FIG. 2 corresponds to the sectional view C—C of FIG. 3.

Figure 4:
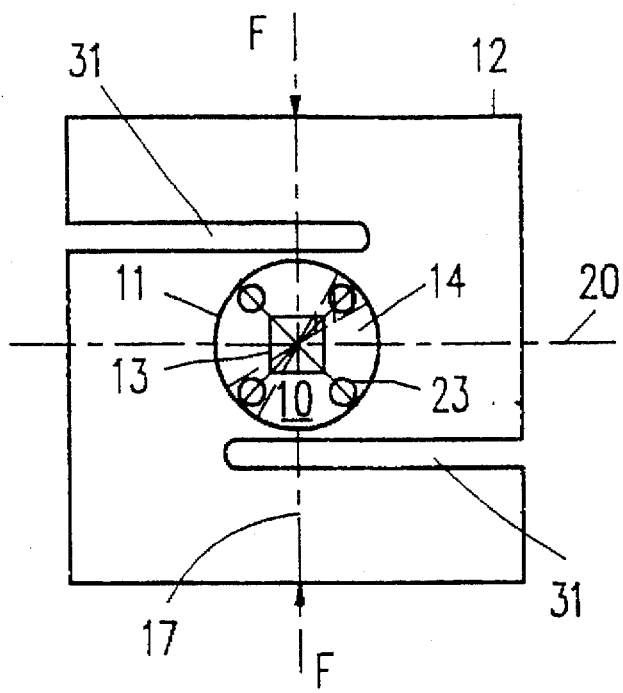
FIG. 4 shows an S-shaped load cell comprising a circular transducer in accordance with the invention.

As has already been stated, FIG. 4 shows a further version of a load cell 12 which may have a square configuration as shown, but also a circular configuration and which comprises a transducer 10 in accordance with the invention. This is a so-called S-shaped load cell 12 which is particularly suitable for compressive and tensile forces and which converts such forces, via its slit-like recesses 31, into a shearing load which acts on a centrically arranged transducer 10 which corresponds substantially to the transducer 10 shown in FIG. 1.

It is to be noted that the sensing element 13 may be constructed as a measuring bridge circuit and may be provided on the surface 14 of the transducer 10 as a strain gauge, for example, by way of a thin-film technique, the transducer itself being made of a high-quality material.

Figure 5:
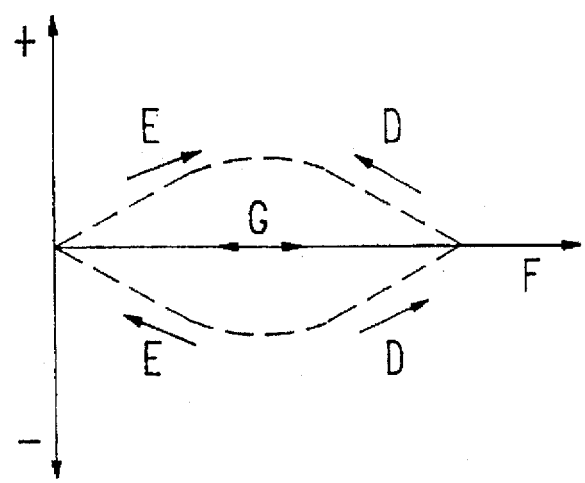
FIG. 5 shows the hysteresis error as a function of the force to be measured.

FIG. 5 shows an orthogonal system of coordinates, the hysteresis error being plotted on its ordinate while the force F is plotted on its abscissa. The hysteresis error is related each time to the final value of the force F. The arrows D represent a normal development of the hysteresis error, i.e. the hysteresis in the case of loading of a transducer other than a transducer in accordance with the invention. The arrows E denote the development of the hysteresis error in the transducer in accordance with the invention. It is clearly shown that the development of the hysteresis error may be completely reversed in the transducer 10 in accordance with the invention. The development according to the arrow E thus represents an overcompensation of the hysteresis effect. Any intermediate situation between these two extremes can be achieved by a configuration in accordance with the invention, for example, by way of the arrangement of the apertures 23; the development of the hysteresis error as denoted by the arrows G can thus also be achieved, so that the transducer 10 is quasi hysteresis-free.

As a result, calibratable load cells exhibiting very small linearity errors can be realised. Moreover, high overloads are not detrimental to the precision of the load cell; normally, i.e. in transducers other than the transducer in accordance with the invention, such overloads lead to a permanent increase of the hysteresis. It is to be noted that, in order to increase the sensitivity to a given degree, it is possible to provide the apertures 15 in all instances, so that a low-hysteresis or hysteresis-free load cell in accordance with the invention may also comprise six apertures as shown in FIG. 1.

The characteristics of the invention as disclosed in the foregoing description, in the figures and in the claims can be of essential importance individually as well as in arbitrary combinations in realising the various embodiments of the invention.

I claim:

1. A disc-shaped transducer for mounting in a load cell of a weighing system, comprising disc-shaped surfaces, each surface being surrounded by a respective periphery, which surfaces extend parallel to one another and parallel to the direction of application of a force to be measured, substantially at the center of at least one of said surfaces, a sensing element for converting a force-dependent deformation into a useful signal for measuring shearing stress, and wherein at least one of the surfaces includes four sub-faces which are formed by a center line parallel to the direction of application of the force and a center line which is orthogonal thereto, at least two of said sub-faces which adjoin one another in only one point comprising a respective area of reduced cross-section in order to influence the hysteresis effect, said area of reduced cross-section being disposed within the respective periphery of said at least one surface.

2. A transducer as claimed in claim 1, characterized in that the two sub-faces which are situated in the densest flux of force comprise a respective area of reduced cross-section.

3. A transducer as claimed in claim 2, characterized in that all four sub-faces comprise an area of reduced cross-section.

4. A transducer as claimed in claim 3, characterized in that the transducer consists of semi-circular sections which are aligned with respect to one another in the direction of the orthogonal centre line.

5. A transducer as claimed in claim 4, characterized in that apertures constitute the areas of reduced cross-section and have a circular cross-section, their respective center point being situated on a radius which encloses an angle of 45°±15° with respect to the orthogonal centre line.

6. A transducer as claimed in claim 5, characterized in that the apertures in the sub-faces have a diameter amounting to from 10 to 30% of the diameter of the semi-circular sections.

7. A transducer as claimed in claim 6, characterized in that in the edge zone of the transducer there are provided apertures, situated to both sides of the center of the transducer on the center line extending parallel to the direction of application of the force, in order to receive connection leads for the sensing elements arranged on both surfaces and to adapt the rigidity or sensitivity of the transducer.

8. A transducer as claimed in claim 7, characterized in that the apertures on the center line have a diameter which amounts to at the most 40% of the diameter of the semi-circular sections.

9. A transducer as claimed in claim 5, characterized in that the transducer comprises a rectangular section having a length between the semi-circular sections, the apertures being provided in the correspondingly enlarged sub-faces in an area which is enclosed by the center line, the 45° radius, a diagonal of the rectangular section and a segment of arc of the section which connects the radius to the diagonal.

10. A transducer as claimed in claim 1 wherein said load cell includes an opening for mounting said transducer, the periphery of said transducer conforming to the opening in said load cell.

* * * * *